Patented Apr. 17, 1934

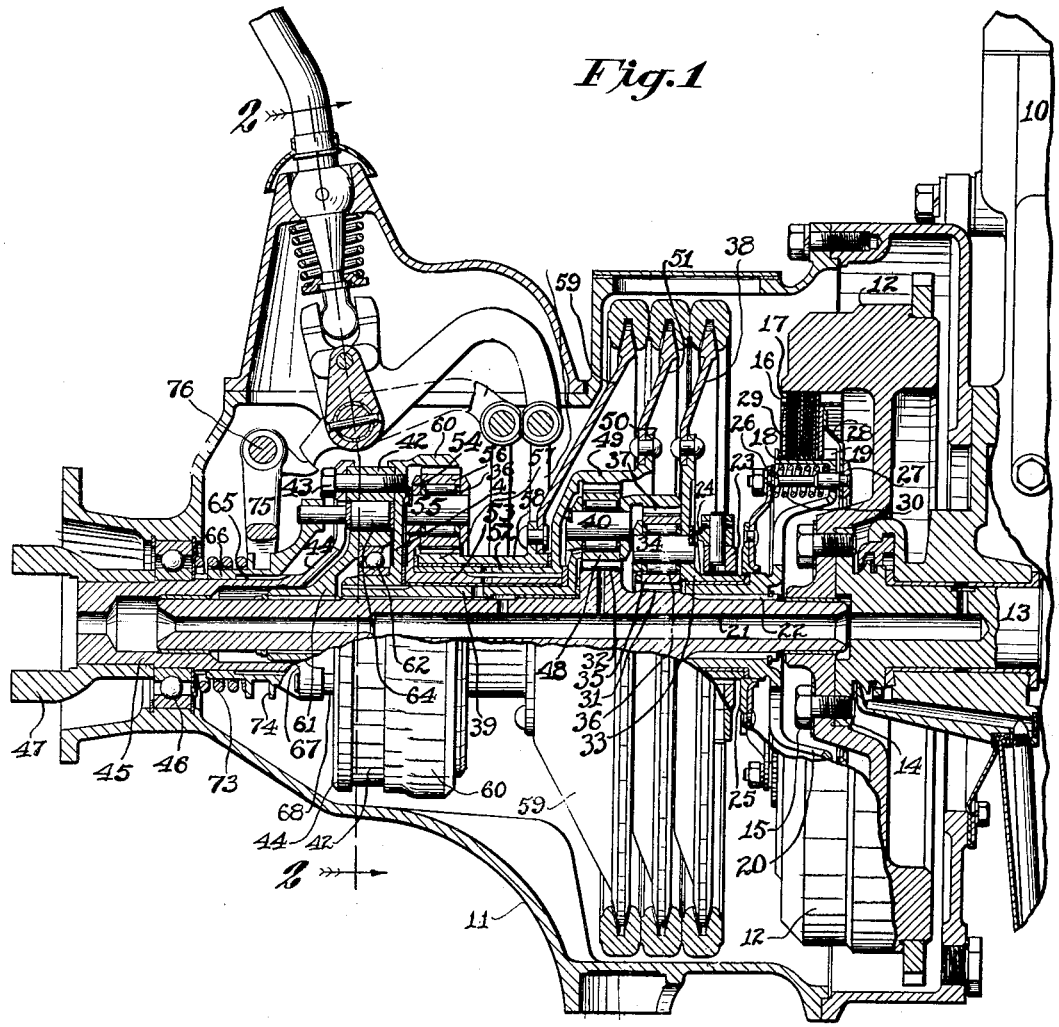

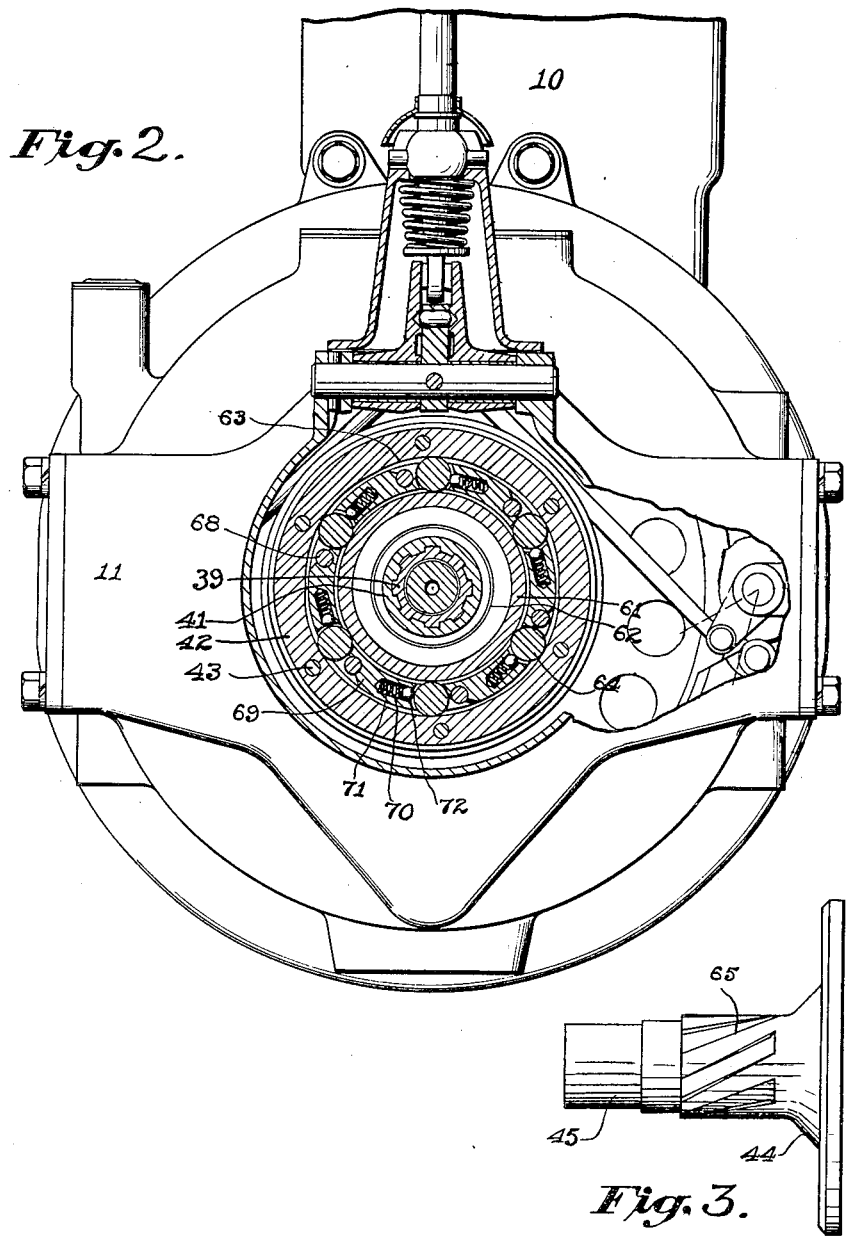

1,955,455

UNITED STATES PATENT OFFICE 1,955,455

CLUTCH

Henry Ford, Dearborn, Mich., assignor to Ford Motor Company, Dearborn, Mich., a corporation of Delaware Application April 21, 1930, Serial No. 446,027

2 Claims. (Cl. 192—47)

The object of my invention is to provide a planetary transmission having a manually operated overrunning clutch disposed between the engine driving member and the final driven shaft which may be thrown in when it is desired to operate the transmission in direct drive. By the use of my overrunning clutch, I obtain a reduction in the fuel necessary to operate the car. During approximately one-third of the driving time, either in traffic or in hilly country, the car is decelerating. During these deceleration periods, either the car is unnecessarily slowed down by the drag of the engine or the engine must be operated at a speed corresponding to the car speed to eliminate this drag. In the former case more fuel must be used to accelerate the car, while in the latter excess fuel must be used to keep the engine operating at car speed during these periods. With my improved transmission the driven members are free to overrun the engine so that during these deceleration periods the engine may be run at idling speed. The saving in fuel resulting from thus idling the engine while the car is coasting down hills or decelerating in traffic is very appreciable. Further, the engine of the car is benefitted because the chief source of oil pumping with its consequent carbon deposits is eliminated.

I have so arranged my overrunning clutch that when the shift lever is in the direct drive position the car will be free to overrun the engine, while when the lever is shifted to any of the reduced speeds the engine will be positively connected with the driven shaft in both directions so that the engine may be used as a brake when descending hills or the like.

With these and other objects in view my invention consists in the arrangement, construction, and combination of the various parts of my improved device, as described in my specification, claimed in my claims, and illustrated in the accompanying drawings, in which:

Figure 1 shows a vertical central sectional view through my improved transmission and engine associated therewith.

Figure 2 shows a sectional view taken on the line 2—2 of Figure 1.

Figure 3 shows a plan view of one of the details, showing the means for manually operating my overrunning clutch.

Referring to Figure 1, I have used the reference numeral 10 to indicate generally an engine associated with an automobile. I have provided a transmission housing 11 secured in the ordinary manner to the rear of this engine in which my improved transmission is mounted. An engine flywheel 12 is fastened to the rear end of an engine crank shaft 13 and is held thereon by means of a flange 14 and bolts 15.

The rear portion of the flywheel ring 12 is provided with internal teeth 16 which form a driving means for a plurality of engine driving clutch plates 17. Driven clutch plates 18 are alternated with the driving plates 17 and have their internal edges notched so as to co-act with correspondingly formed teeth 19 on the exterior of a clutch drum 20. This clutch drum 20 is secured to a clutch shaft 21 by means of splines 22, the shaft being suitably journalled in the hub of the flywheel 12. A clutch throw out member 23 is reciprocally mounted around the hub portion of the clutch drum 20 and is arranged to be reciprocated longitudinally by a fork 24 which is operated by a clutch pedal, not shown in the drawings, but which operates in the conventional manner.

The forward face of the throw-out member 23 operates against a radial flange 25 which extends outwardly adjacent to the periphery of the drum 20. Suitable pins 26 extend forwardly from the flange 25 through suitable openings in the clutch drum 20 and are secured to a ring 27 forwardly of the clutch drum. A dished clutch applying disk 28 extends from the ring 27 to position adjacent to the clutch pates 18. A retaining ring 29 is mounted in a suitable groove extending around the periphery of the teeth 19 for preventing the clutch plates from being forced off the rear edge of the clutch drum 20. I have provided clutch springs 30 disposed around each pin 26 between the clutch drum 20 and the flange 25 which will at all times urge the clutch disks into engagement with each other to thereby apply the clutch.

It may be well to keep in mind that the torque of the engine is taken through the above described clutch for all transmission speeds, and that when this clutch is thrown out of engagement the gearing, brake drums, and other members of the transmission are allowed to stop rotating. Attention is called to this provision to bring out more forcibly the very little energy required to stop any of the brake drums when the clutch is disengaged.

My improved transmission may for convenience of description be divided into three groups of parts, the epicyclic gearing, the direct drive mechanism, and the brake shoe operating and selecting mechanism. The first two of these groups will be described in the order named during the course of this specification.

The clutch shaft 21 is provided with a reverse sun gear 31 formed just rearwardly of the clutch drum 20 and a forward speed sun gear 32 also formed on the shaft 21 just rearwardly of the reverse gear 31. Rotatably mounted upon the hub portion of the clutch drum 20 I have provided a planet carrier 33 which is provided with three planet pins 34 equally spaced around the gear 31. Three reverse planet pinions 35 are rotatably mounted on these pins 34 by means of roller bearings 36 and an internal gear 37 is rotatably mounted to mesh with the outer edges of each of these planet gears. A radial flange extends outwardly from the planet carrier 33 and a disk like reverse brake drum 38 is riveted to the periphery of this flange. The reverse speed is accomplished by holding the drum 38 stationary which stops the planet carrier 33 so that rotation of the clutch shaft 21 will transmit the power through the sun gear 31 and planet gears 35 and will cause the internal gear 37 to rotate in the reverse direction at a reduced speed.

A second planet carrier 39 having a sleeve like hub member formed integrally therewith is rotatably mounted on the intermediate portion of the shaft 21 just rearwardly of the sun gear 32 and is provided with three planet pins 40 spaced around this gear 32. The forward edge of this planet carrier is formed integral with the internal gear 37 so that the reverse speed drive is transmitted from this internal gear through the planet carrier 39. A driven disk 41 is splined to the rear end of the carrier 39 and an overrunning clutch ring 42 is fixedly secured to the rear face of this disk by means of bolts 43. These bolts likewise secure a flange 44 positively to the driven disk 41 which flange is provided with a hub member 45 rotatably mounted on a ball bearing 46 in the rear end of the transmission housing 11. A universal joint member 47 is splined to the rear end of the hub 45 to transmit the drive to the rear axle of the car.

It may be well to keep in mind that the hub 45, flange 44, clutch ring 42, driven disk 41, planet carrier 39, and internal gear 37 are at all times positively connected together and rotate as a unit. The reverse speed drive is thereby readily transmitted from the internal gear 37 to the universal joint 47 through the above mentioned connected parts.

I have provided three first speed planet pinions 48 rotatably mounted by means of a second set of roller bearings 36 on each of the pins 40 so as to mesh with the sun gear 32 and a first speed internal gear 49 is rotatably mounted so as to mesh with the outer edges of each of these planet pinions. A radially extending flange 50 is formed integral with the forward edge of the internal gear 49 and a first speed brake drum 51 is riveted to this flange so that the internal gear 49 may be selectively held stationary to effect the first speed drive. The internal gear 49 is formed integral with a sleeve like hub member 52 which is splined to a sleeve member 53, the latter being rotatably mounted on the hub portion of the planet carrier 39.

The first or low speed drive is effected by holding the brake drum 51 stationary so that rotation of the shaft 21 will transmit the drive through the sun gear 32 and planet pinion 48, thereby driving the planet carrier 39 in the direction of the shaft 21 but at a reduced speed. It will be noted that the first speed sun gear 32 is somewhat larger than the reverse sun gear 31, the reason for which is that equivalent first and reverse speed ratios are desired. Referring to the first speed drive it will be recalled that the speed ratio of the planet carrier 39 to the driven shaft 21 is inversely as the internal gear 49 plus the gear 32 is to the gear 32. While referring to the reverse speed drive, the ratio of the planet carrier 39 is to the shaft 21 inversely as the internal gear 37 is to the sun gear 31. It may thus be seen that a substantially equal reduction in speed in opposite directions is obtained even though the driving gears 31 and 32 are of different sizes.

A planet carrier 54 is formed integral with the rear end of the hub member 53 which is provided with three planet pins 55 upon which planet pinions 56 are rotatably mounted on another set of roller bearings 36. A sun gear 57 is formed integral with the rear end of a sleeve 58 which is rotatably mounted on the hub member 52. An intermediate speed brake drum 59 is riveted to the sleeve 58 so that when this drum is held stationary the sun gear 57 will also be held stationary. An integral gear 60 is formed integral with the outer edge of the driven disk 41 and extends forwardly therefrom to mesh with the outer edges of each of the planet pinions 56.

The intermediate speed drive is obtained through the gear 32 which rotates the planet carrier 39 relative to the internal gear 49 in the ratio of the first speed drive. However, for every revolution which the planet carrier 39 revolves relative to the internal gear 49 the unit as a whole is rotated .77 of a revolution farther by the rotation of the internal gear 49. This added rotation of the whole unit increases the speed of the carrier 39 to that required for an intermediate speed drive.

It has been customary in planetary transmission construction to frictionally clutch two of the relatively rotating members together so that the transmission will rotate as a unit to effect a direct speed drive. This method of forming a direct drive has been dispensed with in this transmission and what is believed to be a new device has been incorporated to directly connect the clutch shaft with the driven member 45 independently of the gearing when direct drive is required. Several advantages result from the use of this device among which are that the transmission gearing is free, there being no strain on any of the gear teeth, and the device requires only a fraction of the manual energy ordinarily required to operate a clutch capable of effecting such a direct drive.

With this device the driven shaft is allowed to overrun the engine in direct drive thereby resulting in material saving in fuel, less wear on the engine, and the elimination of the engine drag which makes driving easier.

My direct drive clutch, as shown in the drawings, consists of a drum 61 which is splined to the clutch shaft 21 just rearwardly of the carrier 39. A ball bearing assembly 62 is provided between the driven disk 41 and this drum to give stability to the parts. Referring to Figure 2, I have provided six arcuately relieved portions 63 machined in the interior of the clutch ring 42 and rollers 64 are placed in each relieved portion between the ring 42 and drum 61. The size of these rollers is so proportioned that when they rest in the center of the relieved portions the drum 61 will be free to rotate without interference from these rollers. However, I have provided means for moving all of the rollers simultaneously relative to the clutch ring 42 so that they will be forced downwardly by the tapered side of the relieved portions into contact with the drum 61 so as to clutch this drum in a manner similar to the action obtained from an overrunning roller clutch.

Referring to Figure 3, the hub portion 45 of the flange 44 is provided with a series of spiral splines 65 and a sleeve 66, having correspondingly formed splines therein, is mounted to reciprocate on the splines 65. It will be thus seen that reciprocation of the sleeve 66 will cause rotation thereof relative to the hub member 45. The sleeve 66 is provided with a plurality of ears 67 having pins 68 extending forwardly therefrom which are reciprocally mounted in a roller retainer 69 so that rotation of the sleeve 66 will rotate the retainer 69. The retainer 69 consists of an annular ring disposed between the drum 61 and the clutch ring 42 and is provided with a plurality of slots therein in which the rollers 64 are free to rotate. I have provided recesses 70 adjacent to each of the rollers 64 into which a spring 71 and ball 72 are reciprocally mounted to resiliently urge the respective rollers against one side of the retainer slots.

The parts are so arranged that reciprocation of the sleeve 66 will cause the retainer 69 to rotate relative to the clutch ring 42 thereby allowing the rollers to clutch the drum 61 so that the latter may drive the clutch ring 42 therewith as a unit. A helical spring 73 is disposed around the rear portion of the sleeve 66 which at all times urges this sleeve into the position to secure a direct drive. A clutch collar 74 is machined in the sleeve 66 and a fork 75, pivotally mounted at 76 in the transmission housing, coacts with this collar to manually reciprocate the sleeve 66 thereby rotating the retainer 69 relative to the clutch ring 42 to the disengaged position to release the direct drive clutch. Means are also provided for holding the clutch fork 75 in this disengaged position during the neutral, reverse, first, and intermediate positions of the transmission.

It may be seen that if at any time the driven shaft tends to overrun the engine, the rollers 64 will be automatically disengaged to allow the engine to slow down independently of the car.

The operation of my transmission is almost identical to that of the conventional sliding gear transmission in that the main clutch is first thrown out by the clutch pedal and then the shift lever operated to release that set of brake shoes corresponding to the speed desired which action almost instantly stops the respective brake drum. The engine clutch is then engaged and the drive taken through the transmission in the ordinary manner. When the next speed is required, the engine clutch is again thrown out and the shift lever moved first back to neutral position and then to the position wherein the desired set of brake shoes are engaged and the engine then engaged so that the new speed is thus accomplished.

Among the many advantages arising from the use of my improved device, it may be well to mention that I have provided a transmission in which simple epicyclic gearing trains are provided for all of the reduced speed drives so that efficient and quiet operation results. Further, I have provided a mechanism operated entirely by the shift lever for engaging and disengaging the respective brake shoes and which, due to the selective anchoring of the non-energized end of each brake shoe, requires only a fraction of energy which would ordinarily be required to operate such a shift lever.

Still a further advantage results from my improved transmission because I have provided an overrunning clutch between the driven shaft and the engine which operates in direct drive so that when the car is decelerating it will be free to overrun the engine thereby accomplishing a saving in fuel, prolonging the life of the engine, and increasing the comfort of the driver. It may be well to mention that if it is desired to use the engine as a brake while descending hills or the like, the intermediate or first speed can be used in which speed the engine is positively connected in both directions to the rear axle.

Still a further advantage results because I have provided a type of overrunning clutch which is manually operable and which may be engaged or disengaged with very little energy.

Some changes may be made in the arrangement, construction, and combination, of the various parts of my improved device, without departing from the spirit of my invention, and it is my intention to cover by my claims, such changes as may reasonably be included within the scope thereof.

I claim as my invention:

1. In a device of the character described, a driving shaft having a clutch drum secured thereto, a driven shaft having a flange thereon which extends radially beyond said drum, a clutch ring secured to said flange in position around and coaxially with said drum, said clutch ring having a plurality of arcuate depressions formed therearound in its inside surface, a clutch roller disposed in each of said depressions, a roller retainer disposed between said drum and ring, said retainer having a plurality of slots therethrough in which said rollers are arranged whereby relative rotation of said retainer with respect to the clutch ring to one of its positions will retain said rollers in alignment with the centers of said depressions to thereby allow relative movement of said drum and clutch ring in both directions, a spiral spline on said driven shaft, a correspondingly splined sleeve reciprocally mounted on said shaft, a driving connection extending through enlarged openings in said driven shaft flange connecting said spirally splined sleeve and said roller retainer, whereby reciprocation of said splined sleeve in one direction will cause said rollers to become inoperative as a clutch in either direction of rotation and reciprocation of said sleeve in the opposite direction will cause said rollers to operate as an overrunning clutch in one direction, a spring resiliently urging said sleeve in said last mentioned direction, and manually operable means for counteracting the force of said spring to thereby render said clutch inoperative in either direction.

2. A device, as claimed in claim 1, wherein the driving connection which extends through the enlarged openings in said driven shaft flange comprises a plurality of pins each of which is fixed in a suitable ear formed on said splined sleeve and each of which is reciprocally mounted in said roller retainer, whereby a reciprocating movement of said sleeve will cause an oscillating movement of said retainer.

HENRY FORD.